United States Patent
Walker

(10) Patent No.: US 10,367,814 B2
(45) Date of Patent: Jul. 30, 2019

(54) ENABLING USER ENTROPY ENCRYPTION IN NON-COMPLIANT MOBILE APPLICATIONS

(71) Applicant: Citrix Systems, Inc., Fort Lauderdale, FL (US)

(72) Inventor: James Walker, Deerfield Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 14/735,318

(22) Filed: Jun. 10, 2015

(65) Prior Publication Data

US 2015/0373023 A1    Dec. 24, 2015

Related U.S. Application Data

(60) Provisional application No. 62/015,473, filed on Jun. 22, 2014.

(51) Int. Cl.
*H04L 29/06* (2006.01)
*G06F 21/54* (2013.01)
*G06F 21/62* (2013.01)

(52) U.S. Cl.
CPC .............. *H04L 63/10* (2013.01); *G06F 21/54* (2013.01); *G06F 21/62* (2013.01); *G06F 21/6218* (2013.01); *H04L 63/20* (2013.01); *G06F 2221/2107* (2013.01)

(58) Field of Classification Search
CPC .................................. H04L 63/10; G06F 21/54
USPC .............................................................. 726/1
See application file for complete search history.

(56) References Cited

U.S. PATENT DOCUMENTS

| | | | | |
|---|---|---|---|---|
| 8,695,060 | B2* | 4/2014 | Wade | G06F 21/54 726/1 |
| 8,826,444 | B1* | 9/2014 | Kalle | H04N 21/25816 709/223 |
| 8,839,234 | B1* | 9/2014 | Voronkov | G06F 8/61 717/172 |
| 9,330,254 | B1* | 5/2016 | Xue | G06F 21/554 |
| 2011/0280166 | A1* | 11/2011 | Nien | H04W 76/064 370/310 |
| 2012/0185920 | A1* | 7/2012 | Zmener | H04L 63/083 726/4 |

(Continued)

OTHER PUBLICATIONS

International Search Report and Written Opinion for PCT/US2015/036464 dated Oct. 2, 2015.

*Primary Examiner* — Jason K Gee
*Assistant Examiner* — Dereena T Cattungal
(74) *Attorney, Agent, or Firm* — Banner & Witcoff, Ltd.

(57) ABSTRACT

Methods and systems for preventing unsecured mobile applications from accessing encrypted resources are presented. In some embodiments, a mobile device may determine that a background process associated with a mobile application is requesting to access an encrypted resource. The mobile device may further determine whether the mobile application has been secured with authentication information. In response to determining that the mobile application has not been secured, the mobile device may suspend the background process until the mobile application has been secured and transmit a request to a mobile application management agent to secure the mobile application using authentication information.

19 Claims, 9 Drawing Sheets

(56) References Cited

U.S. PATENT DOCUMENTS

| | | | | |
|---|---|---|---|---|
| 2013/0024812 A1* | 1/2013 | Reeves | ............... | G06F 3/1423 |
| | | | | 715/810 |
| 2013/0055387 A1* | 2/2013 | Kim | ..................... | G06F 21/55 |
| | | | | 726/22 |
| 2013/0091543 A1 | 4/2013 | Wade et al. | | |
| 2013/0227287 A1 | 8/2013 | Quinlan et al. | | |
| 2013/0310003 A1* | 11/2013 | Sadhvani | ............ | H04W 12/06 |
| | | | | 455/411 |
| 2014/0007117 A1* | 1/2014 | Sima | ..................... | G06F 8/65 |
| | | | | 718/102 |
| 2014/0059703 A1* | 2/2014 | Hung | ................... | G06F 21/53 |
| | | | | 726/28 |
| 2014/0096024 A1* | 4/2014 | Laurent | ............... | G06F 21/128 |
| | | | | 715/739 |
| 2014/0317692 A1* | 10/2014 | Somekawa | ......... | H04L 63/0853 |
| | | | | 726/4 |
| 2015/0341362 A1* | 11/2015 | Dobson | ............. | H04L 67/2823 |
| | | | | 726/27 |
| 2016/0132344 A1* | 5/2016 | Funk | ................ | G06F 9/44578 |
| | | | | 719/328 |

\* cited by examiner

ENABLING USER ENTROPY ENCRYPTION IN NON-COMPLIANT MOBILE APPLICATIONS

CROSS REFERENCE TO RELATED APPLICATIONS

This application claims priority to provisional U.S. Application No. 62/015,473, entitled "Enabling User Entropy Encryption in Non-Compliant Mobile Applications," filed Jun. 22, 2014, the contents of which are herein incorporated by reference in its entirety for all purposes.

FIELD

Aspects described herein generally relate to computer security. More specifically, aspects described herein relate to techniques for securing mobile applications that are non-compliant with the security policies of an enterprise system executing on mobile computing devices.

BACKGROUND

More and more people are using mobile devices in personal and business settings for a variety of purposes. These devices are often used by employees to access company resources, sometimes from remote or unusual locations. Increasingly, corporations and other organizations are providing and/or otherwise enabling their employees and other associates with mobile devices, such as smart phones, tablet computers, and other mobile computing devices. As these devices continue to grow in popularity and provide an increasing number of business applications, enterprise mobile applications are providing employees with means to access networked enterprise applications from their mobile device.

Mobile applications are composed of several different application components and have associated processes that may access encrypted system resources. In order to access encrypted resources, mobile applications need to be secured with authentication information from a user. However, in current mobile devices, several components and/or processes of a mobile application may access system resources before the mobile application prompts the user for authentication information. When unsecured applications attempt to access encrypted resources, unexpected data failures may have a disastrous impact on the stability of the application and sometimes also result in database corruption of the encrypted resource. Conventional mobile device operating systems cannot prevent such non-compliant unsecured applications from accessing encrypted data resulting in application instability.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards securing mobile applications that access encrypted enterprise resources on a mobile device and which do not comply with the security policies set by a mobile device management agent. In particular, in one or more embodiments discussed in greater detail below, mobile application functionalities are deployed, implemented, and/or used in a number of different ways to provide one or more of these and/or other advantages.

In some embodiments, a mobile device processor may determine that a background process associated with a mobile application is requesting access to an encrypted resource. The mobile device may determine whether the mobile application has been secured with authentication information. In response to determining that the mobile application has not been secured, the mobile device may suspend the background process until the mobile application has been secured and transmit a request to a mobile application management agent to secure the mobile application using authentication information.

In some embodiments, the mobile device may allow the mobile application and the background process to execute, without being secured, on the mobile device until the mobile application requests access to the encrypted resource.

In some embodiments, the mobile device may determine whether the background process is secured according to security policies of the encrypted resource. In response to determining that the mobile application is secured according to security policies of the encrypted resource, the mobile device may terminate the background process to prevent unsecured access to the encrypted resource.

In some embodiments, the mobile device may determine that the mobile application does not have access to an encryption key. The mobile device may instruct the mobile application management agent to obtain authentication information to unlock the encryption key required to access the encrypted resource.

In some embodiments, the mobile device may determine whether the mobile application has access to entropic information to unlock at least one encryption key required to secure the mobile application. In response to determining that the mobile application does not have access to the entropic information, the mobile device may allow the mobile application to continue implementing until at least one application component or application process requests access to the encrypted resource. In response to determining that the mobile application has access to the entropic information to unlock at least encryption key, the mobile device may unlock at least one encryption key using the entropic information and secure application components and application processes associated with the mobile application to be able to access the encrypted resource.

In some embodiments, in response to determining that the mobile application has been secured by the mobile application management agent, the mobile device may restart the mobile application and resume background processes associated with the mobile application.

In some embodiments, in response to determining that the mobile application has not been secured, the mobile device may determine whether the mobile application is managed by the mobile application management agent. In response to determining that the mobile application is not managed, the mobile device may allow the mobile application and processes associated with the mobile application to continue their operation without interruption.

In some embodiments, the mobile device may receive display information from the mobile application management agent to generate a display, on a display screen of the mobile device, of a notification to enter the authentication information. The mobile device may generate, for display on the display screen, a prompt to input the authentication information to secure the mobile application. The mobile device may receive user input authentication information. The mobile device may receive, from the mobile application management agent, an unlocked encryption key used to secure the mobile application, wherein the encryption key is unlocked using the user input authentication information. The mobile application management agent, which may be included in the mobile device, may receive the user input authentication information and unlock the encryption key used to secure the mobile application.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
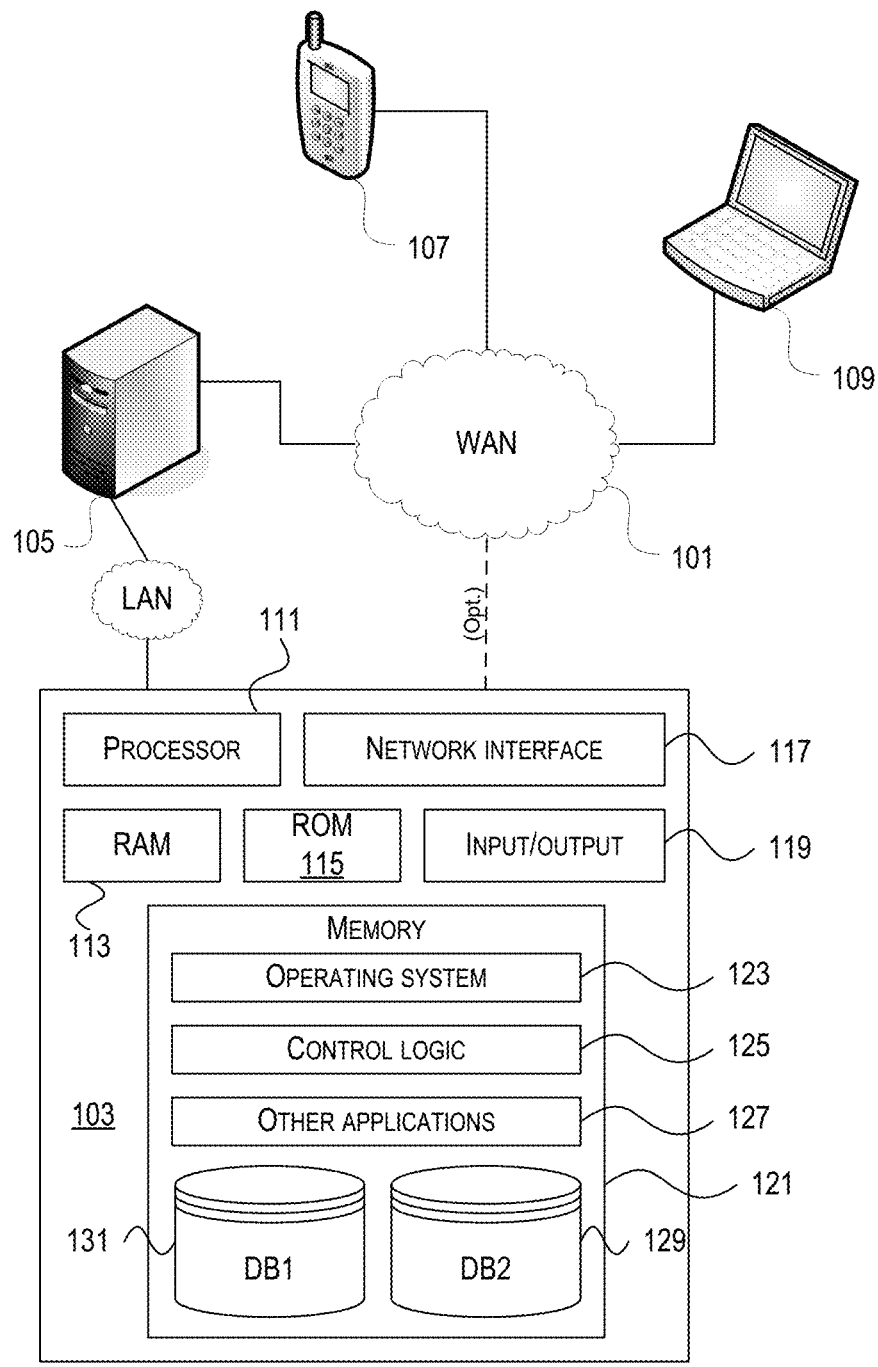
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards securing mobile applications that access encrypted enterprise resources on a mobile device and which do not comply with the security policies set by a mobile device management agent. Currently, there exist numerous mobile applications that are non-compliant with security policies of secured enterprise application environments. However, several of these non-compliant applications require access to encrypted enterprise data before these applications have their security enabled. Such premature unsecured access to encrypted resources often leads to application malfunction and crashes.

The present disclosure describes methods and systems for converting such non-compliant unsecured mobile applications that communicate with encrypted enterprise resources into secured mobile applications that are controlled by an enterprise mobile management agent and are compliant with its security policies. Unmanaged applications that are non-compliant with a secure enterprise application suite's policies may be modified to conform to such policies by being wrapped in a secure application wrapper. All unsecured application components and processes that are running on the mobile device which access encrypted resources may be suspended or terminated until the unmanaged application is secured by the enterprise mobile application management agent. The enterprise mobile application management agent may generate a notification prompt on the mobile device display screen for the user to input authentication credentials to secure the non-compliant mobile application. Once authentication credentials are inputted, encryption keys for encrypting the mobile application may be unlocked and the previously non-compliant mobile application may be secured. Once the mobile application is secured, it may be resumed or launched again and it may be allowed to operate in a secured manner.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
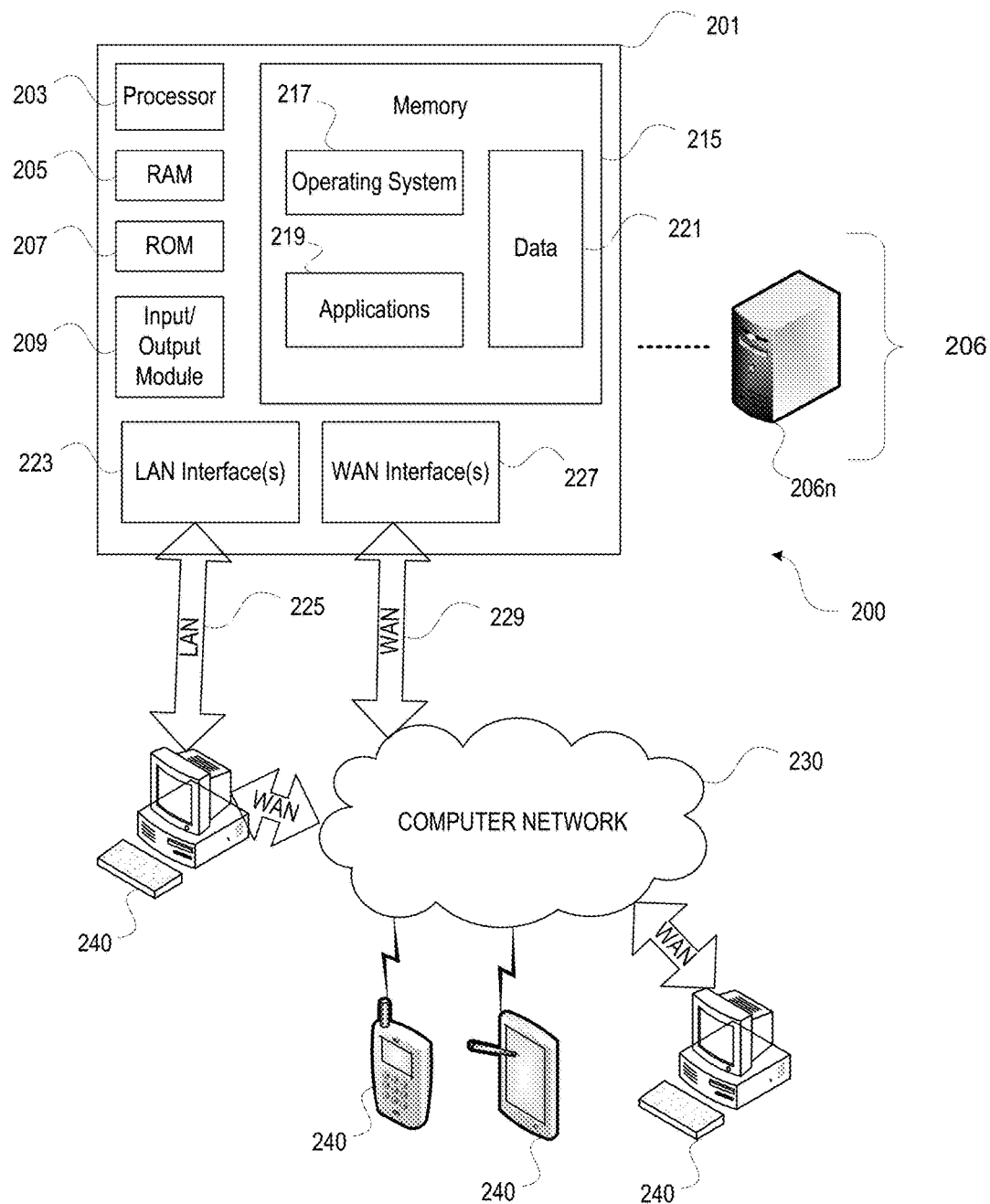
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be a mobile computing device configured to provide access to managed applications to its users in a secure environment. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 as well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Enterprise Mobility Management Architecture

Figure 3:
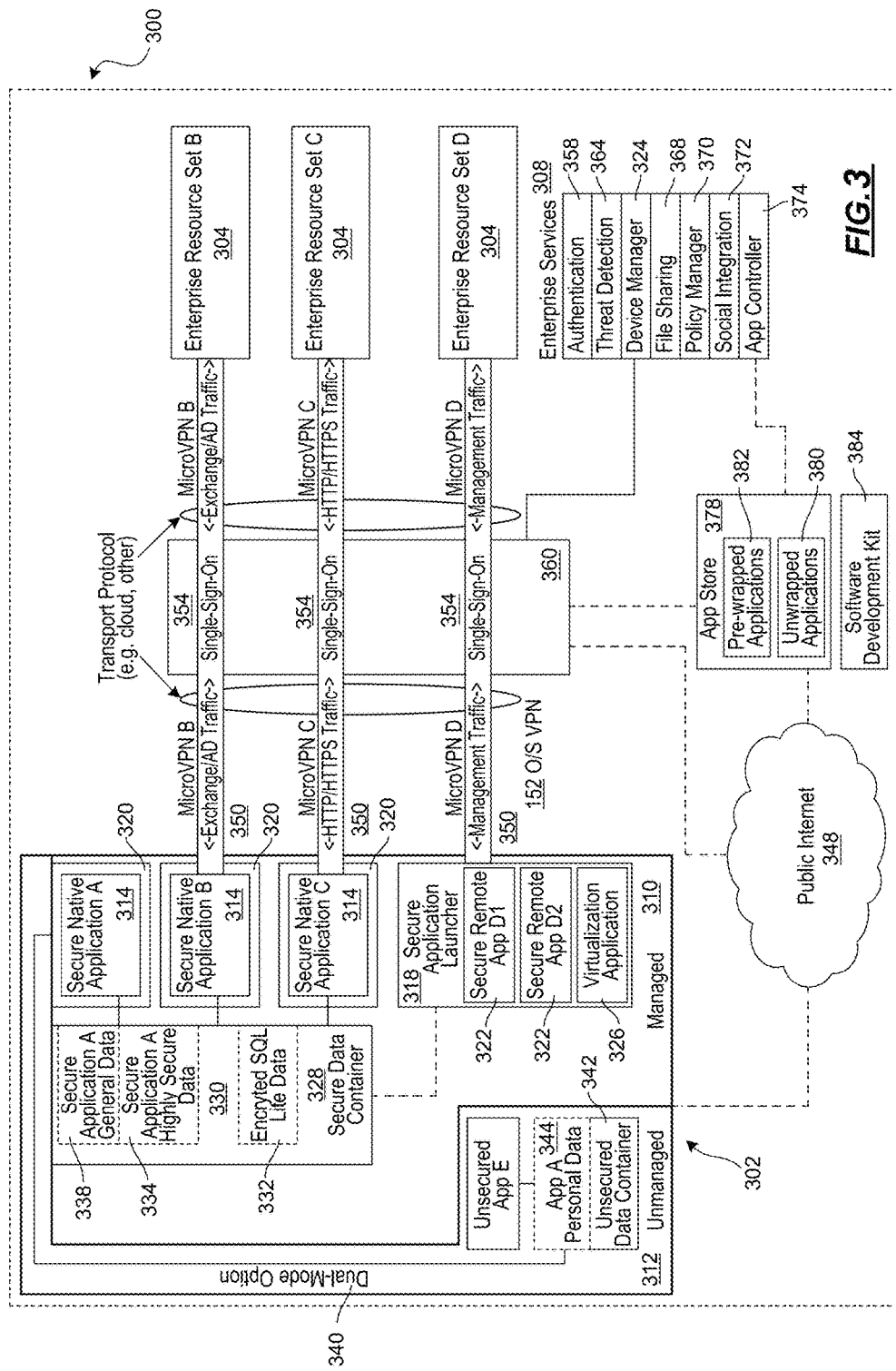
FIG. 3 depicts an illustrative enterprise mobility management system in accordance with one or more illustrative aspects described herein.

FIG. 3 represents an enterprise mobility technical architecture 300 for use in a BYOD environment. The architecture enables a user of a mobile device 302 to both access enterprise or personal resources from a mobile device 302 and use the mobile device 302 for personal use. The user may access such enterprise resources 304 or enterprise services 308 using a mobile device 302 that is purchased by the user or a mobile device 302 that is provided by the enterprise to user. The user may utilize the mobile device 302 for business use only or for business and personal use. The mobile device may run an iOS operating system, and Android operating system, or the like. The enterprise may choose to implement policies to manage the mobile device 304. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 304 that is managed through the application of mobile device management policies may be referred to as an enrolled device.

In some embodiments, the operating system of the mobile device may be separated into a managed partition 310 and an unmanaged partition 312. The managed partition 310 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 314, secure remote applications 322 executed by a secure application launcher 318, virtualization applications 326 executed by a secure application launcher 318, and the like. The secure native applications 314 may be wrapped by a secure application wrapper 320. The secure application wrapper 320 may include integrated policies that are executed on the mobile device 302 when the secure native application is executed on the device. The secure application wrapper 320 may include meta-data that points the secure native application 314 running on the mobile device 302 to the resources hosted at the enterprise that the secure native application 314 may require to complete the task requested upon execution of the secure native application 314. The secure remote applications 322 executed by a secure application launcher 318 may be executed within the secure application launcher application 318. The virtualization applications 326 executed by a secure application launcher 318 may utilize resources on the mobile device 302, at the enterprise resources 304, and the like. The resources used on the mobile device 302 by the virtualization applications 326 executed by a secure application launcher 318 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 304, and the like. The resources used at the enterprise resources 304 by the virtualization applications 326 executed by a secure application launcher 318 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, and engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 328 in the managed partition 310 of the mobile device. The data secured in the secure data container may be accessed by the secure wrapped applications 314, applications executed by a secure application launcher 322, virtualization applications 326 executed by a secure application launcher 322, and the like. The data stored in the secure data container 328 may include files, databases, and the like. The data stored in the secure data container 328 may include data restricted to a specific secure application 330, shared among secure applications 332, and the like. Data restricted to a secure application may include secure general data 334 and highly secure data 338. Secure general data may use a strong form of encryption such as Advanced Encryption Standard (AES) 128-bit encryption or the like, while highly secure data 338 may use a very strong form of encryption such as AES 256-bit encryption. Data stored in the secure data container 328 may be deleted from the device upon receipt of a command from the device manager 324. The secure applications may have a dual-mode option 340. The dual mode option 340 may present the user with an option to operate the secured application in an unsecured or unmanaged mode. In an unsecured or unmanaged mode, the secure applications may access data stored in an unsecured data container 342 on the unmanaged partition 312 of the mobile device 302. The data stored in an unsecured data container may be personal data 344. The data stored in an unsecured data container 342 may also be accessed by unsecured applications 348 that are running on the unmanaged partition 312 of the mobile device 302. The data stored in an unsecured data container 342 may remain on the mobile device 302 when the data stored in the secure data container 328 is deleted from the mobile device 302. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 304 and enterprise services 308 at an enterprise, to the public Internet 348, and the like. The mobile device may connect to enterprise resources 304 and enterprise services 308 through virtual private network connections. The virtual private network connections, also referred to as microVPN or application-specific VPN, may be specific to particular applications 350, particular devices, particular secured areas on the mobile device, and the like 352. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 354. The single-sign-on processes may allow a user to provide a single set of authentication credentials, which are then verified by an authentication service 358. The authentication service 358 may then grant to the user access to multiple enterprise resources 304, without requiring the user to provide authentication credentials to each individual enterprise resource 304.

The virtual private network connections may be established and managed by an access gateway 360. The access gateway 360 may include performance enhancement features that manage, accelerate, and improve the delivery of enterprise resources 304 to the mobile device 302. The access gateway may also re-route traffic from the mobile device 302 to the public Internet 348, enabling the mobile device 302 to access publicly available and unsecured applications that run on the public Internet 348. The mobile device may connect to the access gateway via a transport network 362. The transport network 362 may be a wired network, wireless network, cloud network, local area network, metropolitan area network, wide area network, public network, private network, and the like.

The enterprise resources 304 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 304 may be premise-based resources, cloud based resources, and the like. The enterprise resources 304 may be accessed by the mobile device 302 directly or through the access gateway 360. The enterprise resources 304 may be accessed by the mobile device 302 via a transport network 362. The transport network 362 may be a wired network, wireless network, cloud network, local area network, metropolitan area network, wide area network, public network, private network, and the like.

The enterprise services 308 may include authentication services 358, threat detection services 364, device manager services 324, file sharing services 368, policy manager services 370, social integration services 372, application controller services 374, and the like. Authentication services 358 may include user authentication services, device authentication services, application authentication services, data authentication services and the like. Authentication services 358 may use certificates. The certificates may be stored on the mobile device 302, by the enterprise resources 304, and the like. The certificates stored on the mobile device 302 may be stored in an encrypted location on the mobile device, the certificate may be temporarily stored on the mobile device 302 for use at the time of authentication, and the like. Threat detection services 364 may include intrusion detection services, unauthorized access attempt detection services, and the like. Unauthorized access attempt detection services may include unauthorized attempts to access devices, applications, data, and the like. Device management services 324 may include configuration, provisioning, security, support, monitoring, reporting, and decommissioning services. File sharing services 368 may include file management services, file storage services, file collaboration services, and the like. Policy manager services 370 may include device policy manager services, application policy manager services, data policy manager services, and the like. Social integration services 372 may include contact integration services, collaboration services, integration with social networks such as Facebook, Twitter, and LinkedIn, and the like. Application controller services 374 may include management services, provisioning services, deployment services, assignment services, revocation services, wrapping services, and the like.

The enterprise mobility technical architecture 300 may include an application store 378. The application store 378 may include unwrapped applications 380, pre-wrapped applications 382, and the like. Applications may be populated in the application store 378 from the application controller 374. The application store 378 may be accessed by the mobile device 302 through the access gateway 360, through the public Internet 348, or the like. The application store may be provided with an intuitive and easy to use User Interface.

A software development kit 384 may provide a user the capability to secure applications selected by the user by wrapping the application as described previously in this description. An application that has been wrapped using the software development kit 384 may then be made available to the mobile device 302 by populating it in the application store 378 using the application controller 374.

The enterprise mobility technical architecture 300 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 4:
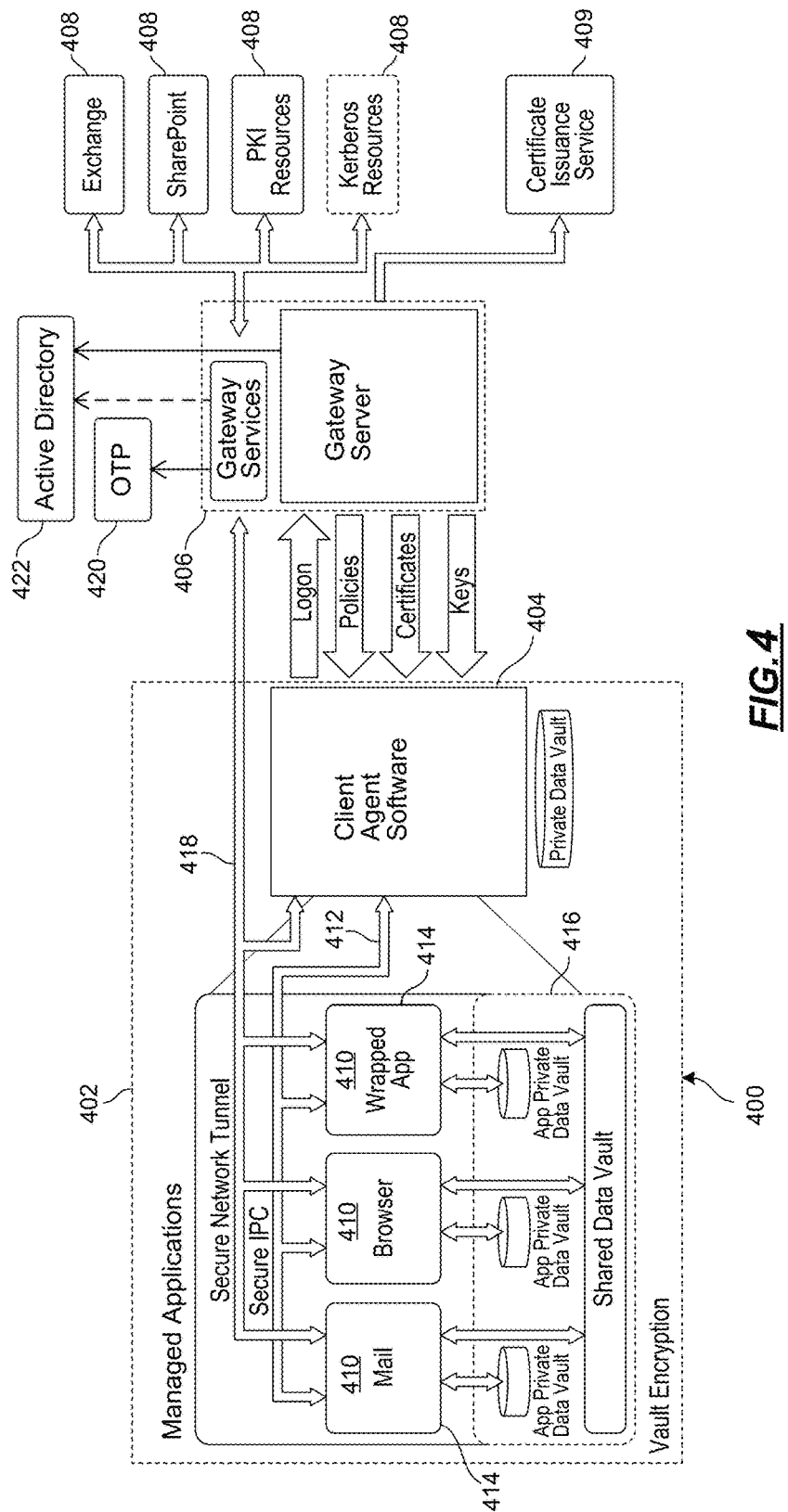
FIG. 4 depicts another illustrative enterprise mobility management system in accordance with one or more illustrative aspects described herein.

FIG. 4 is another illustrative enterprise mobility management system 400. Some of the components of the mobility management system 300 described above with reference to FIG. 3 have been omitted for the sake of simplicity. The architecture of the system 400 depicted in FIG. 4 is similar in many respects to the architecture of the system 300 described above with reference to FIG. 3 and may include additional features not mentioned above.

In this case, the left hand side represents an enrolled mobile device 402 with a client agent 404, which interacts with gateway server 406 (which includes Access Gateway and application controller functionality) to access various enterprise resources 408 and services 409 such as Exchange, Sharepoint, public-key infrastructure (PKI) Resources, Kerberos Resources, Certificate Issuance service, as shown on the right hand side above. Although not specifically shown, the mobile device 402 may also interact with an enterprise application store (StoreFront) for the selection and downloading of applications.

The client agent 404 acts as the UI (user interface) intermediary for Windows apps/desktops hosted in an Enterprise data center, which are accessed using the High-Definition User Experience (HDX)/ICA display remoting protocol. The client agent 404 also supports the installation and management of native applications on the mobile device 402, such as native iOS or Android applications. For example, the managed applications 410 (mail, browser, wrapped application) shown in the figure above are all native applications that execute locally on the device. Client agent 404 and application management framework of this architecture act to provide policy driven management capabilities and features such as connectivity and SSO (single sign on) to enterprise resources/services 408. The client agent 404 handles primary user authentication to the enterprise, normally to Access Gateway (AG) with SSO to other gateway server components. The client agent 404 obtains policies from gateway server 406 to control the behavior of the managed applications 410 on the mobile device 402.

The Secure interprocess communication (IPC) links 412 between the native applications 410 and client agent 404 represent a management channel, which allows client agent to supply policies to be enforced by the application management framework 414 "wrapping" each application. The IPC channel 412 also allows client agent 404 to supply credential and authentication information that enables connectivity and SSO to enterprise resources 408. Finally the IPC channel 412 allows the application management framework 414 to invoke user interface functions implemented by client agent 404, such as online and offline authentication.

Communications between the client agent 404 and gateway server 406 are essentially an extension of the management channel from the application management framework 414 wrapping each native managed application 410. The application management framework 414 requests policy information from client agent 404, which in turn requests it from gateway server 406. The application management framework 414 requests authentication, and client agent 404 logs into the gateway services part of gateway server 406 (also known as NetScaler Access Gateway). Client agent 404 may also call supporting services on gateway server 406, which may produce input material to derive encryption keys for the local data vaults 416, or provide client certificates which may enable direct authentication to PKI protected resources, as more fully explained below.

In more detail, the application management framework 414 "wraps" each managed application 410. This may be incorporated via an explicit build step, or via a post-build processing step. The application management framework 414 may "pair" with client agent 404 on first launch of an application 410 to initialize the Secure IPC channel and obtain the policy for that application. The application management framework 414 may enforce relevant portions of the policy that apply locally, such as the client agent login dependencies and some of the containment policies that restrict how local OS services may be used, or how they may interact with the application 410.

The application management framework 414 may use services provided by client agent 404 over the Secure IPC channel 412 to facilitate authentication and internal network access. Key management for the private and shared data vaults 416 (containers) may be also managed by appropriate interactions between the managed applications 410 and client agent 404. Vaults 416 may be available only after online authentication, or may be made available after offline authentication if allowed by policy. First use of vaults 416 may require online authentication, and offline access may be limited to at most the policy refresh period before online authentication is again required.

Network access to internal resources may occur directly from individual managed applications 410 through Access Gateway 406. The application management framework 414 is responsible for orchestrating the network access on behalf of each application 410. Client agent 404 may facilitate these network connections by providing suitable time limited secondary credentials obtained following online authentication. Multiple modes of network connection may be used, such as reverse web proxy connections and end-to-end VPN-style tunnels 418.

The Mail and Browser managed applications 410 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 406 (including its gateway services) in some cases will not need to validate active directory (AD) passwords. It can be left to the discretion of an enterprise whether an AD password is used as an authentication factor for some users in some situations. Different authentication methods may be used if a user is online or offline (e.g., connected or not connected to a network).

Step up authentication is a feature wherein gateway server 406 may identify managed native applications 410 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 416 (containers) on the mobile device 402. The vaults 416 may be encrypted so that all on-device data including files, databases, and configurations are protected. For on-line vaults, the keys may be stored on the server (gateway server 406), and for off-line vaults, a local copy of the keys may be protected by a user password or biometric validation. When data is stored locally on the device 402 in the secure container 416, it is preferred that a minimum of AES 256 encryption algorithm be utilized.

Other secure container features may also be implemented. For example, a logging feature may be included, wherein all security events happening inside an application 410 are logged and reported to the backend. Data wiping may be supported, such as if the application 410 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 414 may be prevented in other ways. For example, when an application 410 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 420 without the use of an AD (active directory) 422 password for access to one or more applications. In some cases, some users do not know (or are not permitted to know) their AD password, so these users may authenticate using an OTP 420 such as by using a hardware OTP system like SecurID (OTPs may be provided by different vendors also, such as Entrust or Gemalto). In some cases, after a user authenticates with a user ID, a text is sent to the user with an OTP 420. In some cases, this may be implemented only for online use, with a prompt being a single field.

An offline password may be implemented for offline authentication for those applications 410 for which offline use is permitted via enterprise policy. For example, an enterprise may want StoreFront to be accessed in this manner. In this case, the client agent 404 may require the user to set a custom offline password and the AD password is not used. Gateway server 406 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 410 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 404 may be retrieved by gateway server 406 and used in a keychain. Each managed application may have one associated client certificate, identified by a label that is defined in gateway server 406.

Gateway server 406 may interact with an Enterprise special purpose web service to support the issuance of client certificates to allow relevant managed applications to authenticate to internal PKI protected resources.

The client agent 404 and the application management framework 414 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 402 is authenticated to the enterprise, and vice versa. Virtual smart cards for authentication to gateway server 406 may also be implemented.

Both limited and full Kerberos support may be additional features. The full support feature relates to an ability to do full Kerberos login to Active Directory (AD) 422, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 410 is not running.

A multi-site architecture or configuration of enterprise application store and an application controller may be supported that allows users to be service from one of several different locations in case of failure.

In some cases, managed applications 410 may be allowed to access a certificate and private key via an API (example OpenSSL). Trusted managed applications 410 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Figure 5:
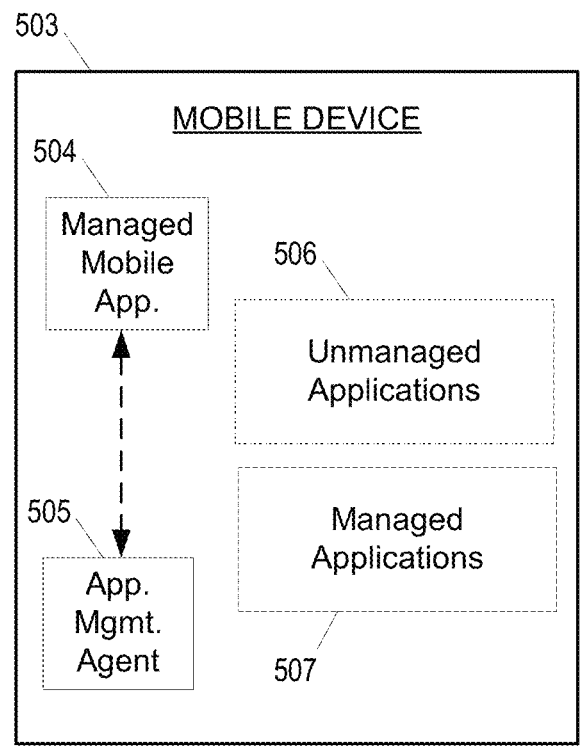
FIG. 5 is a diagram showing an illustrative process of providing a managed mobile application to a mobile device, in accordance with one or more illustrative aspects described herein.

Referring now to FIG. 5, a diagram is shown illustrating an example process receiving and using a managed mobile application by a mobile device 503. As shown in this example, the mobile device 503 may download a managed mobile application from an application store and may download metadata associated with the managed mobile application from an enterprise application store. However, in other examples, both the managed mobile application and the associated metadata may be distributed by and downloaded from a single application store. Further, in some cases, the associated metadata need not be downloaded onto the mobile device 503. For instance the metadata may be accessed by the mobile device 503 only to determine a download URL for the managed mobile application, or might not be accessed at all by the mobile device 503. In other cases, the managed mobile application 504, after being downloaded to the mobile device 503, may be configured to retrieve the metadata from the enterprise application store.

In certain embodiments, mobile applications 504 that include built-in application management support, such as managed mobile applications may be executed on the mobile device 503 in either a managed mode (e.g., in which the application behaves like a managed application) or an unmanaged mode (e.g., in which the application does not behave like a managed application). For example, managed mobile application 504 may execute in an unmanaged mode if an application management agent 505 is not installed on the mobile device 503, and/or if the mobile device user has not logged into the enterprise application store and enrolled the application 504. Thus, users may download managed mobile applications 504 to their devices 503 and run these applications, even if and application management agent 505 is not present or if the user/mobile device 503 has not received the proper authorization to run to the application 504 from the enterprise system (e.g., application management agent 505 and/or enterprise gateway). In contrast, if the application 504 is a published and enrolled application associated with the enterprise application store, the application 504 may be executed in a managed mode, and may behave like a managed application on the mobile device 503.

Additionally, certain enterprise systems may provide dual-mode support for managed mobile applications 504. When dual-mode support is provided, an application may initially run in a first mode (e.g., managed or unmanaged), and subsequently run in a second mode (e.g., managed or unmanaged) in response to a request by the mobile device user and/or based on certain conditions. For example, an application 504 initially running in unmanaged mode may begin running in managed mode after an application management agent 505 is installed on the mobile device 503, the user logs into the enterprise store, and subscribes the application 504. At this point, the application 504 is associated with the enterprise account of the user/mobile device 503, and the application 504 will behave like a managed application. Using this approach, certain application developers may choose to upload two versions of their application (e.g., a personal version and an enterprise version), or may choose to upload a single integrated version of their application. In certain embodiments, applications 504 may only be permitted to transition from unmanaged mode to managed mode, and not from managed mode to unmanaged mode. In other examples, applications 504 may transition both directions.

With respect to dual-mode support for managed mobile applications 504, in certain examples, multiple different application types may be supported to control certain behaviors of the applications 504 in managed mode and unmanaged mode. In some cases, application types for dual-mode support may be determined when the managed mobile application is generated (e.g., modified and re-built). For instance, one or more software tools configured to modify and rebuild a mobile application may be configured to accept an application type input (e.g., as a command-line argument or input into a wizard, data file, or other user interface, etc.). In some examples, a software toolkit may include an API allowing the developer to define an application type for the managed mobile application to be generated.

Application types for dual-mode support may govern various features of execution in managed mode and unmanaged mode, as well as the conditions and requirements for applications to transition between modes. For example, certain application types may be designed to specifically target enterprise users, and developers may prefer that these applications run in managed mode. Applications of this type may be permitted to run in an unmanaged mode before they are associated with an enterprise account, but when running in an unmanaged mode the applications may run with a set of default management policies defined by the developer in a template file. Thus, developers may control the behavior of the certain applications, by setting an application type and configuring default management policies, without any association between the application and an enterprise account. In contrast, other types of applications may be permitted to run in unmanaged mode without any default management policies.

As another example, an application type relating to dual-mode support may require that the mobile device user provides a manual confirmation (e.g., via a dialog box or other user prompt) before the application 504 is transitioned from unmanaged mode to managed mode. In this example, a dialog box or other prompt may be provided to the user only after all of the other conditions of transition from unmanaged to managed have been satisfied (e.g., the application management agent 505 is present on the mobile device 503, an enterprise account was logged into at least once from the application management agent 505, the application 504 is entitled to the user from the enterprise account, and/or the user has subscribed to the application 504). In this case, only if the user confirms will the application 504 be transitioned from unmanaged mode to managed mode, even if all of the other conditions are met. In contrast, other types of applications may be automatically transitioned from unmanaged mode to managed mode without needing a confirmation by the user. In additional examples, application types relating to dual-mode may require that an application 504 run in a specific mode (e.g., unmanaged or managed), or may set the conditions that govern when an application is transitioned between modes.

As discussed above, a managed mobile application 504 may be downloaded to a mobile 503 via an enterprise application store or directly from a public application store. Further, certain managed mobile applications 504 may execute with or without the presence of an application management agent 505 and/or other enterprise infrastructure. Additionally, multiple execution modes may be supported (e.g., managed and unmanaged), and application types and corresponding rules may be implemented to control the execution behavior of the application 504 based on various conditions. Although discussed separately above, these concepts may operate in combination in many scenarios. The examples below further illustrate these concepts in combination for the first time execution of a managed mobile application 504 on a mobile device 503.

In certain examples, the mobile device user may install and log onto the application management agent 505 before downloading the managed mobile application 504. In such cases, the user may log onto the application management agent 505 to subscribe and download the managed mobile application 504 from the public application store, and then launch the application 504. In this example, the application 504 may initiate a handshaking protocol and authentication handshaking process with the application management agent 505 to establish secure inter-process communication (IPC). During executing, the application 504 may flip to the application management agent when the mobile device user is required to enter credentials to log into the application management agent 505.

In other examples, the mobile device user may download managed mobile application 504 from the public application store before installing and/or logging onto the application management agent 505. For example, if the user installs and launches a managed mobile application 504 before the application management agent 505 is installed on the mobile device 503, then managed mobile application 504 may run in unmanaged mode, as discussed above.

In other examples, the mobile device user may download and launch unmanaged applications 506 from the public application store before installing and/or logging onto the application management agent 505. The unmanaged mobile application 506 may continue to operate without any interruption until they access encrypted enterprise resources or communicate with managed applications 507. If unmanaged application communicates with encrypted resources or with managed application 506 that are placed in a secured application wrapper, the application management agent 505 may be launched and may convert the unmanaged application to a managed mobile application 504. Such conversion may be performed by the application management 505 by identifying the software structure of the unmanaged application and inserting code into the unmanaged application to allow application management agent 505 to control the unmanaged application as a managed application 505. Application management agent 505 may rebuild the unmanaged application using the inserted code to convert the unmanaged application into a managed mobile application 504.

In still other examples, if the user launches the managed mobile application 504 for the first time after the application management agent 505 is installed on the mobile device 503, but before the user has logged onto the application management agent, the managed mobile application 504 may be configured to detect that application management agent 505 is installed on the mobile device 503 and automatically start the application management agent 505. After the application management agent 505 is started and the user logs with an enterprise account, the application management agent 505 may be configured to enumerate the user's subscribed applications in the enterprise application store. In this case, the application 504 may be configured to check the set of applications enumerated by the application management agent 505. If the application 504 is subscribed, the application 504 may launch in managed mode, and if the application 504 is not subscribed, the application 504 may launch in unmanaged mode. In additional examples, as discussed above, the application 504 may prompt the user for a confirmation before transitioning from unmanaged to managed mode.

Figure 6:
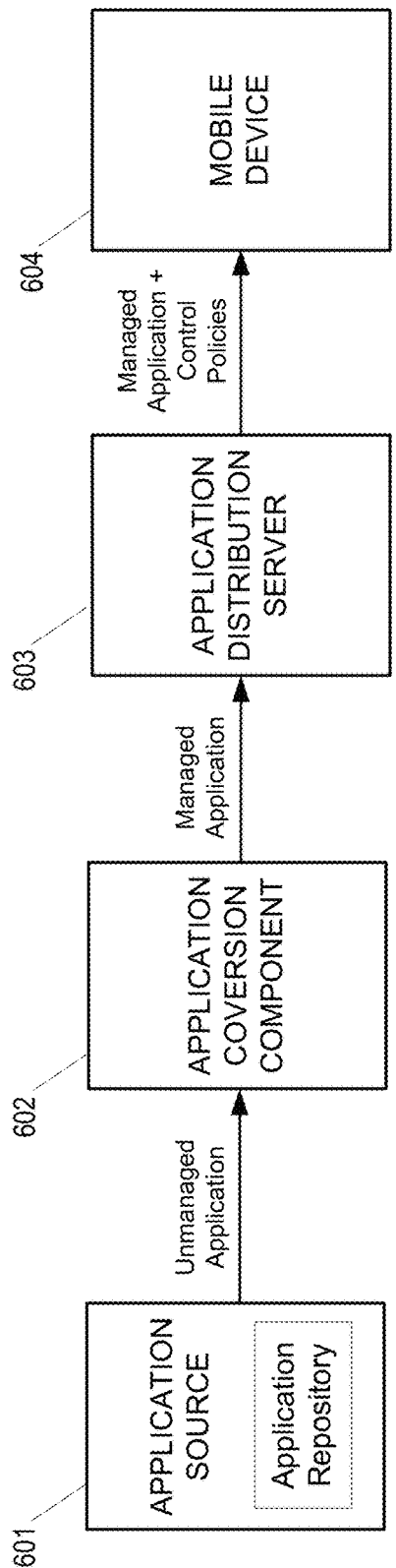
FIG. 6 is a diagram showing an illustrative computing environment for providing managed mobile applications to a mobile device, in accordance with one or more illustrative aspects described herein.

Policy-Based Control of a Managed Application Derived from an Unmanaged Application FIG. 6 and the sections below, illustrate various embodiments and examples relating to policy-based control of a managed application derived from an unmanaged application. Managed applications may be wrapped using a secure application wrapper such as secure application wrapper 320 of FIG. 3 whereas unmanaged mobile applications may not be wrapped by such a secure application wrapper. As in the examples above, some examples of managed applications are described in reference to mobile applications for devices, such as mobile phones, personal digital assistants (PDAs), tablet, and laptop computers. For example, FIG. 6 illustrates example processes in which an unmanaged mobile application is received from an application source 601, and converted into a managed mobile application via application conversion component 602. The managed mobile application may then be provided to an application distribution server 603, from which it may be downloaded by a mobile device 604. However, it should be understood that the concepts described herein are not limited to mobile applications and mobile devices, but may be applied to other types of computing devices as well. For example, managed software applications may be developed for and distributed to personal desktop computers and other non-mobile computing devices, using similar (or the same) techniques described below for mobile applications and mobile devices. Managed applications also may be developed for and distributed to devices on other software platforms, such as television-based platforms (e.g., ANDROID applications for GOOGLE TV, etc.), automobile-based or vehicle-based software platforms, and the like, using similar or the same techniques described below for mobile applications and mobile devices (e.g., software development and modification tools, distribution via application stores, etc.).

Referring to FIG. 6, a diagram is shown illustrating an example computing environment and example process of providing a managed mobile application to a mobile device 604. As shown in this example, an application source 601, such as public application store, an enterprise application store, a software developer, etc., may include a repository of unmanaged apps (e.g., applications which are not under local policy control).

An application conversion component 602 may receive an unmanaged application from the application source 601, decompile the unmanaged application, augment the unmanaged application with a set of instructions that impose control based on a set of policies, and then recompile the unmanaged application to form a managed application. The managed application then may be offered through an application source (e.g., the same application source 601 or a different application store, or an application distribution server 603 such as an enterprise application server, etc.) for use by mobile devices 604. In an embodiment, the application conversion component 602 may be an application management agent such as application management agent 505 of FIG. 5.

Once the managed application is installed on the mobile device 604, the managed application may access, and may operate in accordance with, a set of policies which are separately maintained on the mobile device 604. Additionally, the managed application may request an updated set of policies from the application source (e.g., application source 601, application distribution server 603, etc.) and operate in accordance with the updated set of policies over time and in a routine manner.

Additionally, it should be understood that the various apparatuses of the computing environments shown herein may be computerized and communicate via electronic signals. For example, each computerized apparatus 601-604 may include a communications interface to connect to a communications medium such as a computer network, memory to cache and/or persistently store information, and processing circuitry to execute an operating system and local applications, including some or all of the components discussed above in reference to FIGS. 1 and 2.

In FIG. 6, although the application source 601, converting component 602, and application distribution server 603 are shown as separate apparatuses in this example, it should be understood that any two or all three of these may be implemented as the same apparatus in various examples.

Having discussed several examples of the computing architecture and the enterprise mobility management architecture that may be used in providing and/or implementing various aspects of the disclosure, a number of embodiments will now be discussed in greater detail. In particular, and as introduced above, some aspects of the disclosure generally relate to suspending unsecured non-compliant applications before they access encrypted data and converting such non-compliant applications to secured applications that can be controlled by an enterprise mobile application management agent. Authentication credentials may be collected from the user to secure these converted mobile applications such that they are compliant with the enterprise mobile system's security policies.

Illustrative Embodiments

Figure 7:
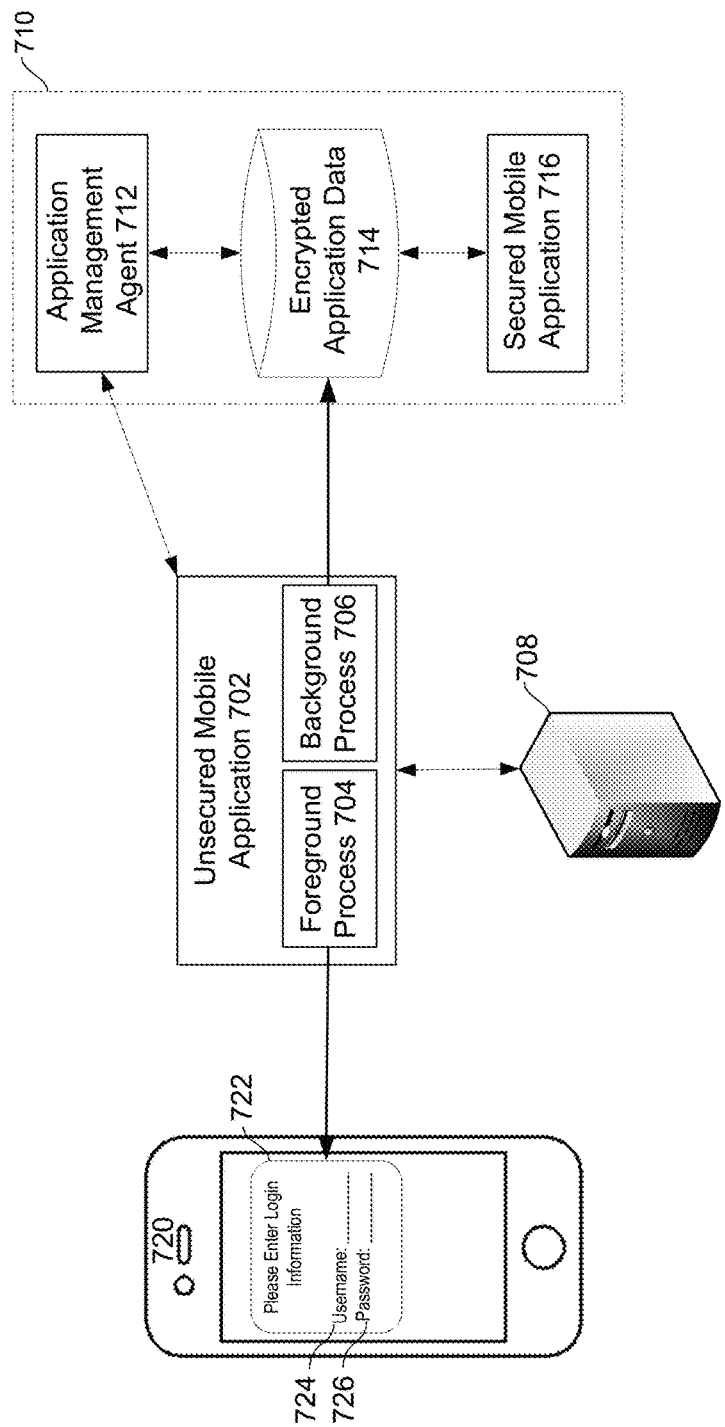
FIG. 7 is a diagram showing an illustrative computing environment for securing an unsecured mobile application which is not compliant with the security policies of a managed computing environment, in accordance with one or more illustrative aspects described herein.

FIG. 7 shows an illustrative computing environment for securing an unsecured mobile application which is not compliant with the security policies of a managed computing environment. An unsecured mobile application 702 and secured mobile application 716 may execute on a mobile computing device 720, also referred to herein as mobile device 720. As mobile device 720 is powered on, several application processes may be automatically activated. Some of these activated processes may be associated with unsecured applications installed on mobile 720 that require access to encrypted enterprise resources such as encrypted application data 714. Unsecured mobile application 702 may be composed of several different application components and may have associated foreground and background processes, such as foreground process 704 and background process 706. An unsecured mobile application such as unsecured mobile application 702 may be a managed mobile application that complies with enterprise application policies such as the user entropy encryption security policy. An unsecured mobile application may not be secured with user provided entropy (e.g., passphrase or PIN) due to a lack of user entropy. A secured mobile application such as secured mobile application 716 may be a managed mobile application that both complies with enterprise application policies and has also been secured with an encryption key unlocked and/or generated using the user provided entropy. An unsecured mobile application may be secured to become a secured mobile application using the techniques described in this disclosure.

Several mobile applications available in the application store may require access to data that may exist in an unencrypted format on mobile devices that do not contain enterprise mobile applications and/or an enterprise mobile application management agent 712. However, for mobile devices such as mobile device 720 that have secured mobile application 716 and application management agent 712 installed, otherwise unencrypted application data may be encrypted along with enterprise data as encrypted application data 714. In accordance with the security policies of secured enterprise managed applications, such application data may be encrypted using user entropy encryption. User entropy encryption is a security technique in which application data and application processes may be encrypted using encryption keys that may be obtained when the user provides an entropy (e.g., passphrase or PIN). The user provided entropy may unlock the encryption keys. For example, the user provided entropy may be used with an encryption key generation feature such that the key used to encrypt data on the device is generated using the entropy (e.g., passphrase or PIN) supplied by the user.

In some embodiments, application management agent 712, encrypted application data 714, and secured mobile application 716 may operate on mobile device 720 in a secured partition 710. Secured partition 710 may correspond to managed partition 310 of FIG. 3. Unsecured mobile application 702 may be implemented on mobile device 720 in an unsecured partition such as unmanaged partition 312 of FIG. 3. Unmanaged applications that are converted to managed applications may be transferred from mobile device 720's unmanaged partition to secured partition 710. Secured partition 710 may have policies applied to it to secure the applications running on and data stored in the secured partition.

In some embodiments, both secured and unsecured applications and managed and unmanaged applications may operate on mobile device 720 without being partitioned. For example, unsecured mobile application 702 and secured mobile application 716 may operate in the same non-partitioned mobile environment. Secured application 716 and encrypted application data 714 may be secured with encryption keys according to user entropy encryption security policies. Access to such encrypted resources may require the application process requesting access to be secured according to similar user entropy encryption security policies.

Application management agent 712 may correspond to client agent 404 described in FIG. 4. Application management agent 712 may manage managed applications such as secured mobile application 716. Application management agent 712 may provide authentication services for its managed applications and may also control their execution. Additionally, application management agent 712 may collect authentication information for unsecured applications in order to secure these applications. Application management agent 712 may be a mobile application running on mobile device 720 that can display notifications in the status bar of mobile device 720's display screen. Application management agent 712 and its background processes, which may be responsible for converting unsecured applications to secured applications and obtaining authentication data, may be running in the background. Application management agent 714 may be launched by a user, upon which a management display interface may be displayed on the display screen of mobile device 720. The management display interface may include links to launch all secured applications that are managed by application management agent 712. The management display interface may allow the user to monitor which managed applications are currently running on mobile device 720 and may allow the user to terminate those currently running applications from the management display interface. The management display interface may display user preferences, user statistics, and include an option to change passcodes for one or more secured applications. The management display interface may display a list of secured applications available from an enterprise application store that are not installed on mobile device 720 and allow the user to download and install such applications. The management display interface may also allow the user to view which unsecured and unmanaged applications are installed on the user device and may allow the user to convert such applications into secured applications.

In some embodiments, unsecured mobile application 702 may be initialized as mobile device 720 is powered on. Unsecured mobile application 702, which may be downloaded to mobile device 720 from a public application store, may run on mobile device 720 in the background, or may have threads or processes that run in the background. For example, even if the mobile device user does not actively open unsecured mobile application 702, its background process 706 may be activated by default once mobile device 720 is powered on or in response to another event on mobile device 720. Background process 706 may perform tasks as directed by the unsecured mobile application 702 without requiring any user input or notification to the user. However, during the course of its operation, background process 706 may also require access to encrypted application data 714. Because background process 706 is not a secured process, access to encrypted application data 714 or any secured data, secured application, or secured process on mobile device 720, hereinafter also referred to as a secured resource or encrypted resource, may be prohibited in order to prevent leakage of secure data to an unsecured process. Accordingly, mobile device 720 may suspend background process 706 once it requests access to encrypted application data 714. By suspending background process 706, mobile device 720 may ensure that the unsecured mobile application 702 will not crash due to unexpected data failure and that secured data is not accessed by an unsecured mobile application process.

In some embodiments, mobile device 720 may wrap all unsecured applications that are attempting to access secure data which do not have secure encryption policies enabled prior to application runtime. All unsecured applications in the unsecured partition of mobile device 720 that require accessing encrypted resources or secured applications may be wrapped by a secure application wrapper such as secure application wrapper 320 of FIG. 3 prior to application runtime. For instance, secured and unsecured mobile applications may be wrapped by a secured application wrapper prior to the mobile application completes installing on mobile device 720. Managed mobile applications running on mobile device 720 at device runtime may have already been wrapped before they are launched. By being wrapped in the secure application wrapper, managed mobile applications may become subject to the secure encryption policies of the mobile application management agent 712. As a virtue of being wrapped by a secure application wrapper, secure inter-process communication (IPC) links between mobile application 702 and application management agent 712 may be formed. Such secure IPC links may allow application management agent 712 to supply policies, including security policies, to be enforced by an application management framework "wrapping" application 702. Security policies may in turn by requested from gateway server 708, which may correspond to gateway server 406 of FIG. 4, to be supplied to unsecured mobile application 702 being wrapped. Application management agent 712 may log into the gateway services part of gateway server 708, which may produce input material to derive encryption keys to secure application 702, or provide client certificates which may enable direct authentication to PKI protected resources.

In some embodiments, mobile device 720 may convert unmanaged applications to managed applications that can be controlled by application management agent 712. For example, application management agent 712 may modify and rebuild an unmanaged mobile application so that its processes may be controlled by application management agent 712, as described in FIG. 6. For example, application management agent 712 may determine which unmanaged mobile applications communicate with managed enterprise mobile applications. These unmanaged applications may be converted, under the direction of application management agent 712, to managed applications by injecting such unmanaged applications with code that allows the application management agent 712 to exert control of the mobile applications' processes and communications. In an embodiment, such conversion of unmanaged application to managed applications may occur in a preprocessing stage before any applications are run on mobile device 720. Application management agent 712 may be able to control, initiate, suspend, resume, and terminate application process of only managed applications. Managed mobile applications may be secured according to user entropy encryption policies.

In some embodiments, mobile device 720 may monitor application methods and classes that may be running on mobile device 720 to determine whether they request access to encrypted resources. Mobile device 720 may suspend execution of these methods and classes. For example, methods, subroutines, and software classes used by unsecured mobile applications installed on mobile device 720 that access encrypted resources may be identified once any such method, subroutine, or software class transmits a request for access to a resource that is encrypted with user entropy encryption. Application components, foreground, and background processes that access encrypted resources may be identified by determining whether such components and processes make function calls to encrypted resources (e.g., encrypted application data 714, secured mobile applications, or other secured processes, etc.). Once such application components and processes are identified, such application components may be suspended to secure such unsecured components and processes in order to prevent them from accessing secured resources.

If unsecured mobile applications are determined to not any have components or associated processes that access encrypted resources, the mobile device 720 may allow such applications to normally execute. Unsecured mobile applications that do not attempt to access any secured resources or communicate with any secured applications may be allowed to operate in an unsecured manner without having application management agent 712 controlling their actions.

In some embodiments, mobile device 720 may determine whether the unsecured applications support secure encryption policies. Policies of the identified unsecured applications may be examined to determine whether user entropy encryption is supported by the identified unsecured applications. For example, the unsecured applications may be examined to determine if they are configured to produce or unlock an encryption key that can be used to secure application data or any other application process. If it is determined that the unsecured applications do support user entropy encryption, then a further determination may be made whether these applications are unencrypted due to a lack of entropy. However, if it is determined that these unsecured applications do not support user entropy encryption or a similar form of security algorithm used by the enterprise applications on mobile device 720 and these unsecured applications are unmanaged, then these unmanaged applications' processes may not be interfered with. Unsecured applications that do not have key encryption policies enabled may be modified to support the same policies as other secured applications, such as user entropy encryption. In some implementations, unsecured applications may be secured by application management agent 712 after application management agent 712 generates an encryption key from user entropy and provides that encryption key to the unsecured application to use to secure itself. In some embodiments, the unsecured applications and their processes may be either suspended or terminated before the unsecured application is secured using the encryption key. Suspending or terminating such unsecured applications to secure the unsecured mobile application using the encryption key may prevent unsecured applications from accessing encrypted resources.

In some embodiments, unsecured applications that have been running on mobile device 720 may be terminated once mobile device 720 determines that these mobile applications are unsecured. For example, mobile device 720 may determine that the mobile application has not been secured and in order to secure it, the application needs to be restarted. Accordingly, mobile device 720 may terminate the mobile application and generate a notification for the user of the mobile device 720 to enter the login information to launch the mobile application that had been terminated. The mobile device 720 may monitor user input to determine whether the user has selected the generated login notification. Upon receiving user selection of such a notification, the mobile device 720 may launch and/or display the application management 712. In turn, the application management agent 712 may generate a prompt for display such as login prompt 722 that prompts the user of mobile device 720 to enter his/her login information. Once the mobile device 720 has received login information through the application management agent 720, the mobile application that was previously terminated may be relaunched and new processes to initialize encryption of the mobile application may be launched.

In some embodiments, mobile device 720 may detect whether authentication data is available to secure unsecure mobile application 702. Unsecured applications configured to access encrypted resources that were identified to support user entropy encryption security policy may be examined to determine whether these applications are unsecured due to a lack of user entropy. Unsecured applications that have not yet authenticated may also be examined to determine whether they have access to user entropy. Mobile device 720 may determine whether authentication data was ever received by such unsecured applications. If mobile device 702 detects that authentication information is required to secure unsecured application 702, application management agent 712 may be notified that the application requires authentication information. At this point, any application processes or components of such unsecured applications that are still active and running may be suspended or terminated to prevent unsecured access to encrypted resources. Suspension or termination of such a process may ensure that no unsecured application component or process requests access to encrypted resources before they have been secured.

In some embodiments, once the unsecured mobile application contacts management agent that it requires encryption keys, the unsecured mobile application may intercept access to secured resources and suspend and/or terminate any background and/or foreground processes requesting access to the secured resources. The unsecured mobile application may search for encryption keys and may determine that it does not have access to the encryption keys required to access the encrypted resources. Upon determining that encryption keys are not available, the unsecured mobile application may determine which of its application components and processes are requesting access to encrypted resources and suspend and/or terminate them to prevent unsecured access to encrypted resources. The unsecured mobile application may have management code that provides instructions for suspending and/or terminating any of its application components and associated processes. Once an unsecured mobile application detects that it does not possess the necessary encryption keys to achieve secured access to encrypted resources, the unsecured mobile application may contact application management agent 712 to retrieve encryption keys. Application management agent 712 may determine whether it has access to authentication information (e.g., user entropy) that is needed to generate and/or unlock the encryption keys required by the unsecured application. If application management agent 712 does not have access to the user entropy, application management agent 712 may obtain authentication information from the user. For example, application management agent 712 may generate a notification in the status bar of the display screen of mobile device 720. Once a user selects such a notification, login prompt 722 may be displayed on the display screen of mobile device 720. The login prompt may allow the user to enter authentication information such as username 724 and password 726. Once application management agent 712 obtains such authentication information from the user, the application management agent 712 may transmit the authentication information to unsecured mobile application 702 to allow it to use the received authentication information to secure itself with user entropy encryption. In this manner, application management agent 712 may generate a user interface such as login prompt 722 to obtain authentication information and may supply unsecured applications such application 702 with authentication information to allow these unsecured applications to become secured. Unsecured applications that may not be otherwise able to call upon foreground process 704 to display a user prompt to obtain authentication information when they startup and initialize background process 706 that may access encrypted resources, can be secured with the help of application management agent 712 before their background process 706 may access encrypted resources.

In some embodiments, mobile device 720 may monitor if any unsecured application components or processes are requesting access to any secured applications or encrypted data 714 at a point of time after the unsecure mobile applications initially running on mobile device 720 have been secured. For example, in some implementations, unsecured mobile applications may be downloaded from an application store after an initial time at which unsecured mobile applications that were initially installed on mobile device 720 have been secured. These unsecured mobile applications' components and background processes may access encrypted resources before their foreground processes have a chance to request authentication information from the user to enabled secured access. Accordingly, to ensure that any of these unsecured mobile applications that were not initially secured do not access encrypted resources without being secured by user entropy encryption, mobile device 720 may suspend and/or terminate the background processes and applications components of such unsecured mobile applications. Application management agent 712 may be notified that these unsecured applications require secured access to encrypted resources. Application management agent 712 may generate a login prompt 722 on the display screen of mobile device 720 to collect authentication information from the user and pass that authentication information to the unsecured application. Application management agent 712 may unlock or generate encryption keys using the authentication information and transmit the encryption keys to the unsecured application. Once the unsecured mobile application receives the encryption keys, the mobile application may encrypts its own application data using the encryption keys and secure itself. After these previously unsecured mobile applications have been secured and converted to secured applications, they may be relaunched or their suspended processes and components may be resumed.

In some embodiments, application management agent 712 may suspend an unsecured mobile application 702. Application management agent 712 may detect that an unsecured application or a process associated with an unsecured mobile application is requesting access to an encrypted resource. To prevent data leakage, data corruption, and an unexpected application crash due to failure to receive expected encrypted data, the unsecured application or unsecured application process may be suspended. All metadata, application state and data associated with the unsecured application or application process may be preserved in a temporary storage with a backup of the application processes that are active while the application or its associated process are suspended. Mobile device 720 may suspend the unsecured application or application process until it receives an instruction from application management agent 712 that the unsecured application or associated process has been secured or makes that same determination itself, at which point the suspended mobile application or application process may be resumed. In some implementations, the suspended application or application process may be resumed from the same point at which it was suspended by retrieving the state and saved backup from a temporary storage and passing those saved values into the now secured application and application process.

In other embodiments, application management agent 712 may terminate mobile application 702. Application management agent 712 may detect that an unsecured application or a process associated with an unsecured mobile application is requesting access to an encrypted resource. To prevent data leakage, data corruption, and an unexpected application crash due to failure to receive expected encrypted data, the unsecured application or unsecured application process may be terminated. All metadata, application state and data associated with the unsecured application or application process may be preserved in a temporary storage with a backup of the application processes that are active while the application or its associated process are terminated. For example, the mobile device may instruct unsecured mobile application 702 or unsecured background process 706 to shut down. By instructing the unsecured application to shut down its own process, the application termination does not cause an unexpected system crash and maintains stability in the mobile device operating system environment. When mobile device 720 receives an instruction from application management agent 712 that the unsecured application or associated process has been secured or makes that same determination itself, mobile device 720 may restart the terminated application or application process. In some implementations, the terminated application or application process may be resumed from the same point at which it was suspended by retrieving the state and saved backup from a temporary storage and passing those saved values into the now secured application and application process.

In some embodiments, the application management agent 712 may determine whether to suspend or terminate unsecured background processes. If the application management agent 712 determines that an unsecured background process is accessing encrypted resources, the application management agent 712 may suspend the unsecured background process. The application management agent 712 determines whether the unsecured background process has been wrapped by user-entropy enabled software (e.g., whether the background process and/or the mobile application related to the unsecured background process has been wrapped according to security protocols requiring user entropy for encryption). If the application management agent 712 determines that the unsecured background process or its related mobile application has been wrapped by user-entropy enabled software prior to the unsecured background process attempts to access encrypted resources, then the application management agent 712 may suspend the unsecured process. If the application management agent 712 determines that the unsecured background process or its related mobile application has not been wrapped by user-entropy enabled software prior to the unsecured background process attempts to access encrypted resources, then the application management agent 712 may terminate the unsecured background process requesting access to the encrypted resources. Additionally or alternatively, if the application management agent 712 determines that the unsecured background process or its related mobile application has been wrapped by security protocols prior to user entropy protocols were supported (e.g., if the security protocols with which the background process and/or its related application does not enable user entropy encryption protocols), then the application management agent 712 may terminate the unsecured background process requesting access to the encrypted resources. In some embodiments, the application management agent 712 may determine whether encrypted resources are being accessed by an unsecured background process or an unsecured background process. If the application management agent 712 determines that encrypted resources are being accessed by an unsecured background process, the application management agent 712 may suspend the unsecured background process and generate a notification to the user indicating that an unsecured process is attempting to access encrypted resources. If the application management agent 712 determines that encrypted resources are being accessed by an unsecured foreground process, the application management agent 712 may terminate the unsecured foreground process and/or terminate the associated mobile application and generate a login prompt on the display screen of the mobile device prompting the user to enter authentication information to relaunch the recently terminated mobile application.

Figure 8:
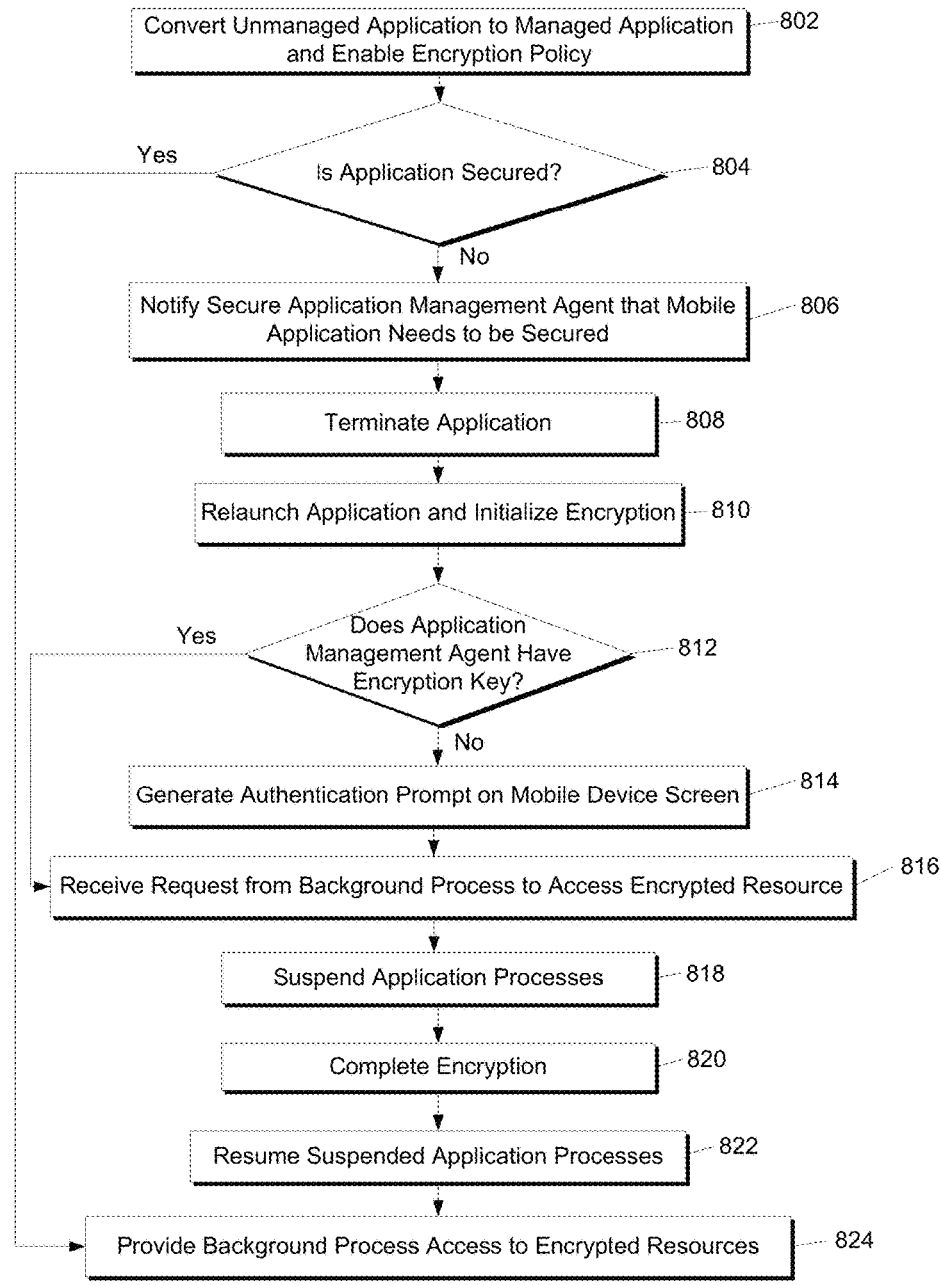
FIG. 8 depicts a flowchart that illustrates a method of preventing an unsecured mobile application from accessing an encrypted resource and allowing the mobile application to access the encrypted resource once it has been secured in accordance with one or more illustrative aspects described herein.

FIG. 8 depicts a flowchart that illustrates a method of preventing an unsecured mobile application from accessing an encrypted resource and allowing the mobile application to access the encrypted resource once it has been secured in accordance with one or more illustrative aspects described herein. In one or more embodiments, the method of FIG. 8 and/or one or more steps thereof may be performed by the processor of a mobile computing device (e.g., generic computing device 201, mobile device 302, mobile device 402, or mobile device 720). In other embodiments, the method illustrated in FIG. 8 and/or one or more steps thereof may be embodied in computer-executable instructions that are stored in a computer-readable medium, such as a non-transitory computer-readable memory.

As seen in FIG. 8, the method may begin at step 802 in which a mobile device may convert an unmanaged mobile application into a managed mobile application and enable encryption policies in the converted managed mobile application. For example, the mobile device may detect that an unmanaged application needs to be conformed to the security policies of managed enterprise applications. Accordingly, the mobile device may modify the unmanaged application by inserting source code that allows the application management agent to control the application. The application management agent may also add source code into the identified mobile application to enable enterprise security policies and other enterprise policies. Once the identified mobile application has been modified with the desired changes, the previously unmanaged mobile application may be rebuilt with the additional modifications into a converted managed enterprise mobile application that conforms to the policies, including the security policies, of native managed enterprise mobile applications.

At step 804, the mobile device may determine whether the managed mobile application is secured. For example, the mobile device may identify whether the mobile application configured to access encrypted resources is secured according to enterprise mobile application security policies. The mobile application may be examined to determine whether it has encrypted its application data with secure encryption keys using user provided entropy (e.g., passphrase or PIN). The mobile application may be further examined to determine whether such encryption is not enabled due to lack of authentication information (e.g., entropy). In response to determining that the managed mobile application is secured with user encryption policies, the method may proceed to step 824 to provide background processes of the managed secure mobile application access to encrypted resources.

At step 806, in response to determining that the managed mobile application has not been secured, the mobile device may notify application management that the unsecured mobile application needs to be secured. For example, a software call may be made to the application management agent, which may be operating in the background, to exert control over the identified unsecured mobile applications and to obtain authentication information to secure these mobile applications.

At step 808, the mobile device may terminate the mobile application. In order to enable encryption in the unsecured mobile application, the mobile device may terminate the application. If the mobile device determines that any one of the several processes associated with a mobile application becomes unsecured, the mobile device terminates the associated mobile application. For example, even if only one of several processes of the mobile application is determined to be unsecured and/or unencrypted, the mobile device may terminate the mobile application associated with that unsecured and/or unencrypted process. Upon termination of the mobile application due to an unsecure process, the mobile device may generate a notification for the user of the mobile application to enter his or her login information to relaunch the mobile application. Upon user input of the login information, the mobile device may use the login information to secure and/or encrypt the previously unsecured process. The mobile device may periodically monitor each of the processes executing as part of a mobile application to ensure that each process passes the security requirements set by the mobile application for such a process. In another implementation, the mobile device may terminate particular application processes that cannot operate while the application is being secured. For example, any application processes and application components that may be modified as the mobile application is secured, may be terminated by the mobile device while some other application components and/or processes may be allowed to continue operation.

At step 810, the mobile device may relaunch the mobile application and initialize encryption. The mobile device may relaunch the mobile application that may have been terminated in step 808 and create new processes. The mobile device may create new processes at application relaunch that initialize encryption of the unsecured mobile application. For example, once the application is terminated and then relaunched, processes that initialize encryption of the application may be initiated that were not otherwise present when the application was previously running. These new processes may be activated by the mobile device at application relaunch after the application has attempted to enable encryption. As part of initializing encryption, the mobile application may query the application management agent whether encryption keys are available to begin encrypting application data and components.

At step 812, the mobile device may determine whether the application management agent has an encryption key needed to secure the unsecured mobile application. The application management agent, under the instructions of the mobile device, may search memory locations and application data to determine whether it has access to encryption keys. The application management agent may furthermore detect whether user entropy was ever received at the unsecured application or at the application management agent for the unsecured application in question. If the application management agent has the encryption key needed to secure the unsecured mobile application, the method may proceed to step 816 to receive a request from a background process of the unsecured mobile application to access the encrypted resource.

At step 814, in response to determining that application management agent does not have the encryption key needed to secure the unsecured mobile application, the mobile device may generate an authentication prompt on the mobile device screen. For example, the mobile device may receive instructions from application management agent to generate a notification to the user to provide authentication credentials. Once the user selects such a notification, the mobile device may be instructed to generate display of a login prompt to the user. Such a notification may be displayed at the same time or immediately after the identified application processes and components have been suspended or terminated. The mobile device may collect authentication credentials inputted from the user in response to the displayed authentication prompt in order to secure the mobile application. Once the application management agent has collected user input authentication data, the application management agent may remove the name of unsecured application from the notification displayed on the screen of the mobile device. For example, application management agent may display a notification message on the status bar of the mobile device display screen that includes the names of all the unsecured applications for which user input authentication data has not yet been received from the user. However, once the application management agent has collected user input authentication data for an unsecured application, the name of the corresponding unsecured application may be removed from such a notification message displayed in the status bar of the mobile device display screen. In another implementation, once the mobile device determines that the application management agent has received user input authentication data and the user entropy has been verified, the mobile device may remove the names of the mobile applications for which such user input authentication is applicable. For example, if the user logon information that is entered for the user satisfies the authentication requirements for obtaining user entropy for five mobile applications, the mobile device may remove those corresponding five mobile applications from the list of unsecured applications from the notification message that may be displayed on the status bar or any other portion of the mobile device. A single login may secure more than one mobile application. The mobile device may identify which enterprise mobile applications share the same login authentication data and upon receipt of user input authentication credentials, the mobile device may encrypt the processes for each of these mobile applications and secure them.

Once authentication data is collected from the user, the mobile device may allow the unsecured application to continue executing along with encryption processes until any process or component associated with the unsecured application requests to access encrypted resources. However, as long as there is no request to access encrypted resources, the mobile device may allow the unsecured application to continue performing in an uninterrupted manner with its processes. Meanwhile, the application management agent may unlock or generate encryption keys using the authentication information (e.g., entropy) received from the user. Once the application management agent has produced unencrypted encryption keys, the application management agent may transmit the unencrypted encryption keys to the unsecured application to complete encryption.

At step 816, the mobile device may receive a request from a background process of the unsecured mobile application to access the encrypted resource. As the application is running, one of its background processes or even foreground processes may require access to encrypted resources such as secure application data or communicate with secure application components or processes. Such access to encrypted resources may be requested by the unsecured application's process as part of its operation. The mobile device may receive such a request and identify the unsecured application process from which the request is received.

At step 818, in response to receiving a request from a background process to access the encrypted resource, the mobile device may suspend application processes of the unsecured application. Once a background process requests access to encrypted resources, the mobile device may suspend the process requesting to access the encrypted resources. If the mobile device determines that it cannot suspend the background process, the mobile device may terminate the background process requesting to access the encrypted resources. In yet another embodiment, the mobile device may terminate the mobile application. The mobile device may save any information generated by the mobile application or processes including the current state of the mobile application for later use when execution of the mobile application is resumed once the mobile application has been secured.

At step 820, the mobile device may complete encryption of the unsecured mobile application. The mobile device may enable entropy encryption using the authentication information received from the user. For example, the application management agent may use the received authentication information to generate or unlock encryption keys. The application management agent may transmit the encryption keys to the unsecured mobile application. The mobile device may encrypt application components, and data using the encryption keys according to user entropy encryption security policies set forth for managed enterprise mobile applications. The previously unsecured mobile application may now be secured according to the same security policies as secured resources such as encrypted application data and secure native enterprise mobile applications. The newly secured application may now be allowed to freely communicate with such encrypted resources.

At step 822, the mobile device may resume any suspended application processes. The mobile device may identify which application processes were suspended or even terminated in order for the mobile application to be encrypted. The mobile device may resume or relaunch these application processes. In an embodiment, the mobile device may resume or relaunch such application processes from the point at which they were suspended or terminated with data that the mobile device saved before the corresponding application process was suspended or terminated.

At step 824, the mobile device may provide background processes of the managed secure mobile application access to encrypted resources. Once the previously non-compliant unsecured mobile application has been secured, the mobile device may allow the now secured application's background process access to encrypted resources.

Figure 9:
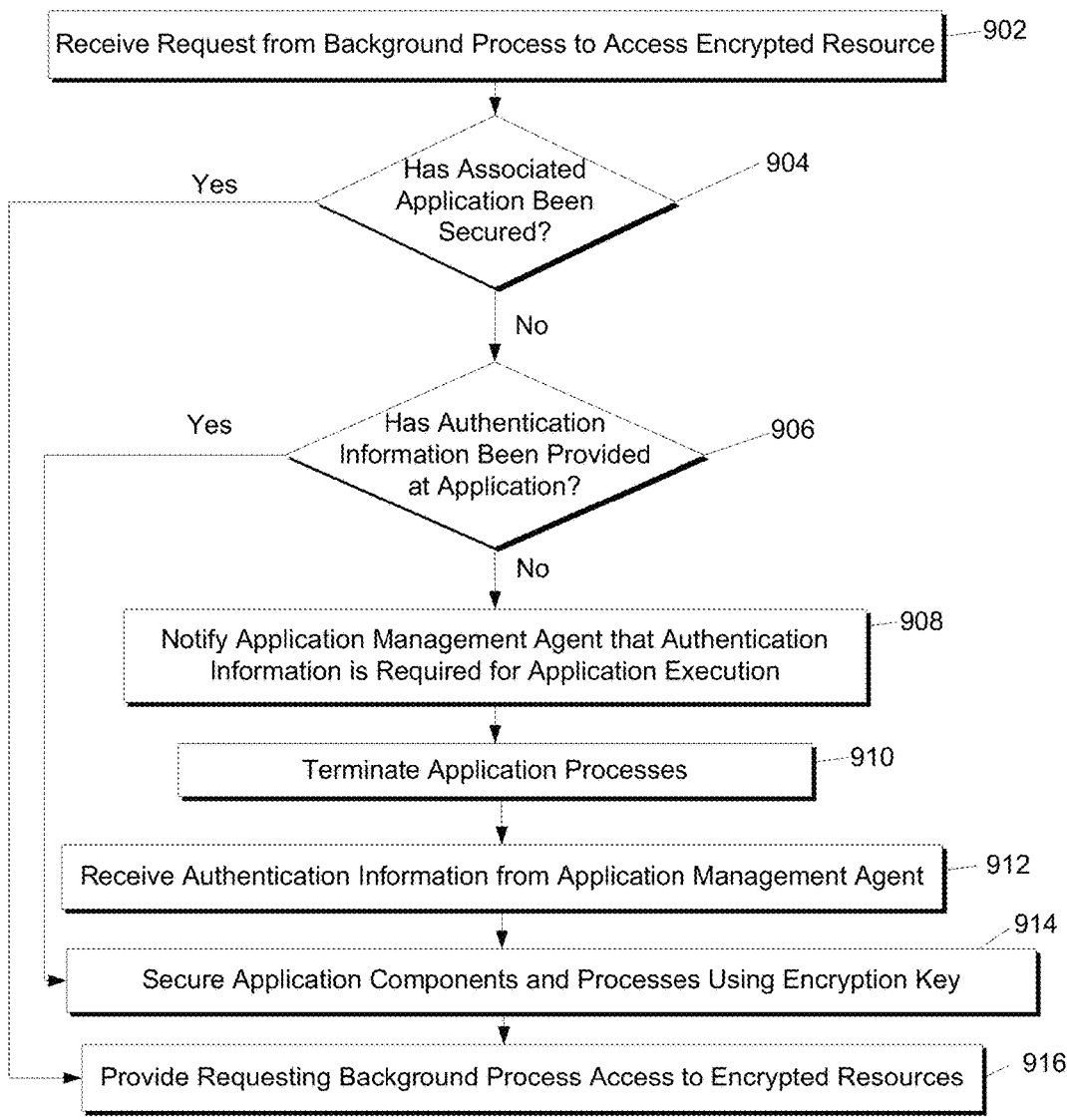
FIG. 9 depicts a flowchart that illustrates a method of encrypting an unsecured mobile application in accordance with one or more illustrative aspects described herein.

FIG. 9 depicts a flowchart that illustrates a method of encrypting an unsecured mobile application in accordance with one or more illustrative aspects described herein. In one or more embodiments, the method of FIG. 9 and/or one or more steps thereof may be performed by the processor of a mobile computing device (e.g., generic computing device 201, mobile device 302, mobile device 402, or mobile device 720). In other embodiments, the method illustrated in FIG. 9 and/or one or more steps thereof may be embodied in computer-executable instructions that are stored in a computer-readable medium, such as a non-transitory computer-readable memory.

As seen in FIG. 9, the method may begin at step 902 in which a mobile device may receive a request from a background process of an unsecured managed application to access encrypted resources. In some embodiments, such a step may occur after unsecured mobile applications initially installed on the mobile device are secured in step 822 of FIG. 8. The background process that requests access to the encrypted process may be a background process associated with a managed application that is typically not configured to access encrypted resources or may be a background process associated with a managed application that was updated or newly installed after the previously unsecured mobile applications described in FIG. 8 have been secured. The mobile device may receive the request to access an encrypted resource from such an unsecured application process and in response, the mobile device may identify the mobile application associated with such a background process.

At step 904, the mobile device may determine whether the mobile application associated with the requesting background process has been secured. The mobile device may determine whether the mobile application associated with the requesting background process and the background process itself are secured using the security policies that enterprise resources and mobile applications conform to (e.g., user entropy encryption). For example, the mobile device may perform a query of whether the mobile application is wrapped with a secure application wrapper and resides in a secured partition of the mobile device to determine that the mobile application is a managed application that complies with the policies of managed enterprise applications. The mobile device may determine whether the unsecured mobile application has the necessary encryption keys required to secure the mobile application once user authentication information is provided. Alternatively, the mobile device may determine whether the application management agent has key generators to generate the encryption keys required to secure the mobile application once the authentication information is provided. If the mobile application associated with the requesting background process has already been secured with the security policies of enterprise mobile applications (e.g., user entropy encryption), then the method may proceed to step 916 and grant the requesting background process access to the encrypted resource.

At step 906, the mobile device may determine whether authentication information has been provided at the unsecured mobile application. The mobile application may determine whether the user has already provided authentication information to the unsecured application which has not yet been used to secure the mobile application. Alternatively, the mobile device may determine whether the mobile application can access authentication credentials from a related process or source without prompting the user to enter such information. If authentication information has been provided at the unsecured mobile application, then the method may proceed to step 914 to secure the application components and processing by using the authentication information.

At step 908, the mobile device may notify the application management agent that authentication information is required for execution of the unsecured application. For example, a software call may be made to the application management agent, which may be operating in the background, to exert control over the identified unsecured mobile applications and to obtain authentication information to secure these mobile applications.

At step 910, the mobile device may terminate the mobile application's processes. Once the application management agent is notified that a mobile application needs authentication information to be secured, mobile device may terminate the application components or processes configured to access the encrypted resources. In another embodiment, the mobile device may terminate the mobile application. In yet another embodiment, the mobile device may suspend application components or processes configured to access the encrypted resources. The mobile device may save any information generated by the mobile application or processes including the current state of the mobile application for later use when execution of the mobile application is resumed once the mobile application has been secured.

At step 912, the mobile device may receive authentication information from the application management agent. The application management agent may generate a login prompt on the display screen of the mobile device and may receive authentication information input from the user (e.g., passphrase of PIN). The application management agent may generate unencrypted encryption keys using the received authentication information. The application management agent may transmit the received passcode to the mobile device processor to secure the application components and processes associated with the mobile application requesting access to the encrypted resources.

At step 914, the mobile device may secure the application components and processes by using the encryption key(s) generated by the application management agent. The mobile device may encrypt application processes, components, and data using the encryption keys according to user entropy encryption security policies set forth for managed enterprise mobile applications. The mobile application that was previously unsecured may now be secured on the mobile device along with secured resources such as encrypted application data and secure native enterprise mobile applications.

At step 916, the mobile device may provide the requesting background process access to encrypted resources. Once the previously non-compliant unsecured mobile application has been secured, the mobile device may restart the terminated application and allow the now secured application access to encrypted resources. Alternatively, if the mobile device had suspended or terminated the previously unsecured mobile application's processes or components to secure the mobile application, the mobile device may resume or restart the suspended or terminated application processes and components and allow them access to the encrypted resources when they request it.

Although the subject matter has been described in language specific to structural features and/or methodological acts, it is to be understood that the subject matter defined in the appended claims is not necessarily limited to the specific features or acts described above. Rather, the specific features and acts described above are described as illustrative implementations of the following claims. It is to be understood that the above disclosure is illustrative only. The following illustrative embodiments are representative only, and not intended to be limiting in any respect.

What is claimed is:

1. A method comprising:
   initializing, by a processor of a mobile device, a background process of a mobile application executing on the mobile device, wherein said initializing is in response to the mobile device being powered on, and without receiving user input indicating a request to initiate the mobile application;
   determining, by the processor of the mobile device, that the background process associated with the mobile application is automatically making an initial request to access to an encrypted resource;
   determining, by the processor of the mobile device, whether the mobile application has been secured with user input authentication information; and
   responsive to determining, by the processor, that the background process has made the initial request and that the mobile application has not been secured:
   suspending, by the processor of the mobile device, prior to receiving the user input indicating the request to initiate the mobile application, and prior to receiving the user input authentication information, the background process until the mobile application has been secured, wherein suspending the background process comprises an initial suspension of the background process and occurs prior to receiving an initial authentication attempt corresponding to the user input authentication information, wherein suspending the background process comprises suspending one or more components if the mobile application configured to access encrypted resources while allowing other components of the mobile application to continue to operation;
   and transmitting, by the processor of the mobile device, a request to a mobile application management agent to secure the mobile application using the user input authentication information.

2. The method of claim 1, further comprising allowing the mobile application and the background process to execute, without being secured, on the mobile device until the mobile application requests access to the encrypted resource.

3. The method of claim 1, further comprising:
   determining whether the background process is secured according to security policies of the encrypted resource; and
   responsive to determining that the mobile application is secured according to security policies of the encrypted resource, suspending the background process to prevent unsecured access to the encrypted resource.

4. The method of claim 1, further comprising:
   determining whether the mobile application does not have access to an encryption key; and
   instructing the mobile application management agent to obtain authentication information to unlock the encryption key required to access the encrypted resource.

5. The method of claim 1 further comprising:
   determining whether the mobile application has access to entropic information to unlock at least one encryption key required to secure the mobile application;
   responsive to determining that the mobile application does not have access to the entropic information, allowing the mobile application to continue implementing until at least one application component or application process requests access to the encrypted resource;
   responsive to determining that the mobile application has access to the entropic information to unlock at least encryption key, unlocking at least one encryption key using the entropic information; and
   securing application components and application processes associated with the mobile application to be able to access the encrypted resource.

6. The method of claim 1, further comprising:
responsive to determining that the mobile application has been secured by the mobile application management agent:
restarting the mobile application; and
resuming background processes associated with the mobile application, wherein the background processes are granted initial access to the encrypted resource.

7. The method of claim 1, further comprising:
responsive to determining that the mobile application has not been secured, determining whether the mobile application is managed by the mobile application management agent; and
responsive to determining that the mobile application is not managed, allowing the mobile application and processes associated with the mobile application to continue their operation without interruption.

8. The method of claim 1, further comprising:
receiving display information from the mobile application management agent to generate a display, on a display screen of the mobile device, of an initial notification to enter the user input authentication information;
generating, for display on the display screen, an initial prompt to input the user input authentication information to secure the mobile application;
receiving the user input authentication information, wherein the user input authentication information corresponds to the initial authentication attempt; and
receiving, from the mobile application management agent, an unlocked encryption key used to secure the mobile application, wherein the encryption key is unlocked using the user input authentication information.

9. The method of claim 1, further comprising:
determining, by the processor of the mobile device, that the user input authentication information satisfies authentication requirements for a second mobile application; and
removing, by the processor of the mobile device and based on the determination that the user input authentication information satisfies the authentication requirements for the second mobile application, the second mobile application from a list of unsecured mobile applications.

10. The method of claim 1, further comprising:
storing state information corresponding to the mobile application for later use during execution once the mobile application is secured.

11. The method of claim 1, wherein determining that the mobile application has not been secured further comprises determining that the mobile application is not wrapped with a secure file wrapper.

12. The method of claim 1, wherein suspension of the background process occurs prior to determining that an unsuccessful authentication attempt occurred.

13. An apparatus comprising: at least one processor;
at least one display screen; and
at least one memory storing computer-readable instructions that, when executed by the at least one processor, cause the apparatus to:
initialize a background process of a mobile application executing on a mobile device, wherein said initializing is in response to the mobile device being powered on, and without receiving user input indicating a request to initiate the mobile application;
determine that the background process associated with the mobile application is automatically making an initial request to access to an encrypted resource;
determine whether the mobile application has been secured with user input authentication information; and
responsive to determining that the background process has made the initial request and that the mobile application has not been secured:
suspend, prior to receiving the user input indicating the request to initiate the mobile application and prior to receiving the user input authentication information associated with security of the mobile application, the background process until the mobile application has been secured, wherein suspending the background process comprises an initial suspension of the background process and occurs prior to receiving an initial authentication attempt corresponding to the user input authentication information, wherein suspending the background process comprises suspending one or more components if the mobile application configured to access encrypted resources while allowing other components of the mobile application to continue to operation;
and transmit a request to a mobile application management agent to secure the mobile application using the user input authentication information.

14. The apparatus of claim 13, wherein the computer-readable instructions, when executed by the at least one processor, cause the apparatus to:
determine whether the background process is secured according to a security policy of the encrypted resource;
responsive to determining that the mobile application is secured according to security policies of the encrypted resource, suspend the background process to prevent unsecured access to the encrypted resource;
determine whether the mobile application does not have access to an encryption key; and
instruct the mobile application management agent to obtain authentication information to unlock the encryption key required to access the encrypted resource.

15. The apparatus of claim 13, wherein the computer-readable instructions, when executed by the at least one processor, cause the apparatus to:
determine whether the mobile application has access to entropic information to unlock at least one encryption key required to secure the mobile application;
responsive to determining that the mobile application does not have access to the entropic information, allow the mobile application to continue implementing until at least one application component or application process requests access to the encrypted resource;
unlock at least one encryption key using the entropic information in response to determining that the mobile application has access to the entropic information to unlock at least encryption key; and
secure application components and application processes associated with the mobile application to be able to access the encrypted resource.

16. The apparatus of claim 13, wherein the computer-readable instructions, when executed by the at least one processor, cause the apparatus to:
responsive to determining that the mobile application has been secured by the mobile application management agent:

restart the mobile application; and resume background processes associated with the mobile application, wherein the background processes are granted initial access to the encrypted resource.

17. The apparatus of claim 13, wherein the computer-readable instructions, when executed by the at least one processor, cause the apparatus to:

responsive to determining that the mobile application has not been secured, determine whether the mobile application is managed by the mobile application management agent; and responsive to determining that the mobile application is not managed, allow the mobile application and processes associated with the mobile application to continue their operation without interruption.

18. The apparatus of claim 13, wherein the computer-readable instructions, when executed by the at least one processor, cause the apparatus to:

receive display information from the mobile application management agent to generate a display, on the display screen, of an initial notification to enter the user input authentication information;

generate, for display on the display screen, the initial notification to enter the user input authentication information to secure the mobile application;

responsive to receiving an initial user selection of the initial notification, generate, for display on the display screen, an initial prompt to input the user input authentication information;

receive the user input authentication information, wherein the user input authentication information corresponds to the initial authentication attempt; and receive, from the mobile application management agent, an unlocked encryption key used to secure the mobile application, wherein the encryption key is unlocked using the user input authentication information.

19. The apparatus of claim 13, wherein the computer-readable instructions, when executed by the at least one processor, cause the apparatus to:

determine, by the processor of the mobile device, that the user input authentication information satisfies authentication requirements for a second mobile application; and remove, by the processor of the mobile device and based on the determination that the user input authentication information satisfies the authentication requirements for the second mobile application, the second mobile application from a list of unsecured mobile applications.

* * * * *